US007201505B2

(12) United States Patent
Sugimoto et al.

(10) Patent No.: US 7,201,505 B2
(45) **Date of Patent: *Apr. 10, 2007**

(54) PROJECTOR TYPE VEHICLE HEADLAMP

(75) Inventors: Atsushi Sugimoto, Shizuoka (JP); Hideki Fukuchi, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 41 days.

This patent is subject to a terminal disclaimer.

(21) Appl. No.: 11/076,402

(22) Filed: Mar. 9, 2005

(65) Prior Publication Data

US 2005/0201117 A1 Sep. 15, 2005

(30) Foreign Application Priority Data

Mar. 12, 2004 (JP) ........................ P. 2004-070067

(51) Int. Cl.
*B60Q 1/00* (2006.01)

(52) U.S. Cl. ...................... 362/539; 362/512; 362/538

(58) Field of Classification Search ................ 362/538, 362/539, 512, 324, 323
See application file for complete search history.

(56) References Cited

U.S. PATENT DOCUMENTS

| | | | | |
|---|---|---|---|---|
| 5,339,226 | A * | 8/1994 | Ishikawa | 362/539 |
| 5,379,196 | A * | 1/1995 | Kobayashi et al. | 362/466 |
| 2001/0040810 | A1* | 11/2001 | Kusagaya | 362/351 |
| 2005/0024889 | A1* | 2/2005 | Sugimoto | 362/539 |

FOREIGN PATENT DOCUMENTS

| | | |
|---|---|---|
| JP | 6-48601 | 6/1994 |

* cited by examiner

*Primary Examiner*—Renee Luebke
*Assistant Examiner*—Zahra I. Bennett
(74) *Attorney, Agent, or Firm*—Fish & Richardson P.C.

(57) ABSTRACT

A projector type vehicle headlamp comprises a reflector, a light source, a projection lens, a rotational shade to shield part of light reflected on the reflector so as to be directed towards the projection lens and a motor for driving the rotational shade based on a light distribution switching over operation. In the headlamp, a high beam corresponding light shielding plate and an another beam corresponding light shielding plates are disposed on the rotational shade on both sides of a low beam corresponding light shielding plate, so that the light distributions are attempted to be switched over speedily between the low beam and the another beams and the generation of glare is attempted to be prevented.

16 Claims, 15 Drawing Sheets

PROJECTOR TYPE VEHICLE HEADLAMP

This application claims foreign priority based on Japanese patent application No. JP-2004-070067, filed on Mar. 12, 2004, the contents of which is incorporated herein by reference.

BACKGROUND OF THE INVENTION

The present invention relates to a projector type headlamp in which reflected light from a substantially cup-shaped reflector is projected and distributed forward by a projection lens, and more particularly to a projector type vehicle headlamp which can change over light distributions by rotating a shade.

Disclosed in JP-B-06-048601 is a projector type vehicle headlamp in which a light source bulb is disposed near a primary focal point of a reflecting mirror, light emitted from the light source bulb is reflected on the reflecting mirror, the reflected light is made to converge to a secondary focal point near a meridional image plane of a convex lens and a rotational shade is disposed. The rotational shade has a rotational axis within a plane which intersects with a optical axis at a right angle and intersects with a line of intersection between a vertical plane including the optical axis and the meridional image plane of the convex lens. The rotational shade includes two light shielding plates having differently shaped cut-off lines which are mounted on an outer circumference of the rotational axis, whereby beam distribution patterns are changed by rotating the rotational axis.

In the projector type vehicle headlamp of JP-B-06-048601, beams on the basis of a plurality of light distribution patterns can be emitted. However, the light shielding plate for forming a light distribution pattern corresponding to the low beam and the light shielding plate for forming a light distribution pattern corresponding to another beam which is different from the low beam are set to a positional relation in which the light shielding plates are apart 180° from each other in the circumferential direction, and a position which is apart 90° from the respective light shielding plates is set for forming a light distribution pattern corresponding to the high beam (a light distribution pattern-suitable for driving with no oncoming vehicle). Namely, the light shielding plate corresponding to the low beam and the light shielding plate corresponding to the another beam which is different from the low beam are disposed distantly in the circumferential direction on both sides of a position for the high beam.

Therefore, when the light distributions are switched over from the low beam, which is used most frequently, to the another beam, or from the another beam to the low beam, it is inevitable that the high beam is emitted, and hence there has been caused a problem that an oncoming vehicle may be dazzled.

SUMMARY OF THE INVENTION

The present invention has been made in view of such circumstances, and an object of the present invention is to prevent the emission of high beam in the process where the light distributions are switched over between the other beam than the high beam and the low beam.

In order to achieve the object, according to a first aspect of the invention, there is provided a projector type vehicle headlamp comprising a substantially cup-shaped reflector, a light source disposed substantially at a primary focal point of the reflector, a projection lens disposed forward of a secondary focal point of the reflector, a light distribution controlling rotational shade which is disposed substantially near the secondary focal point of the reflector, which extends in a direction which intersects with an optical axis of the projection lens substantially at right angles, which is arranged rotatably and which is made to form a predetermined light distribution pattern by shielding part of light which travels from the reflector side towards the projection lens by a side edge portion thereof which is situated near the optical axis, and a motor for driving the rotational shade, wherein at least a low beam corresponding light shielding portion, a high beam corresponding light shielding portion and an another beam corresponding light shielding portion are provided on the rotational shade in such a manner as to be adjacent to one another in a circumferential direction. In the projector type vehicle headlamp, the high beam corresponding light shielding portion and the another beam corresponding light shielding portion are disposed in such a manner that the low beam corresponding light shielding portion is interposed therebetween.

Note that the description that "the high beam corresponding light shielding portion and the another beam corresponding light shielding portion are disposed in such a manner that the low beam corresponding light shielding portion is interposed therebetween" means that "the low beam corresponding light shielding portion, the high beam corresponding light shielding portion and the another beam corresponding light shielding portion are disposed such that the low beam corresponding light shielding portion is inevitably passed whenever the light distributions are switched over between the high beam corresponding light shielding portion and the another beam corresponding light shielding portion by rotating the rotational shade".

(Function) Since the low beam corresponding light shielding portion exists between the another beam corresponding light shielding portion and the high beam corresponding light shielding portion which are disposed in the circumferential direction, the light distribution is not temporarily set on the high beam (corresponding light shielding portion) or the high beam is not emitted when the light distributions are switched between the another beam corresponding light shielding portion and the high beam corresponding light shielding portion by rotating the rotational shade.

In addition, since the high beam corresponding light shielding portion and the another beam corresponding light shielding portion are provided circumferentially on both sides of the low beam corresponding light shielding portion, which is used most frequently, the light distribution can be switched over speedily between low beam and high beam or from high beam to low beam.

According to a second aspect of the invention, there is provided a projector type vehicle headlamp as set forth in the first aspect of the invention, wherein central angles formed between the circumferentially adjacent beam corresponding light shielding portions are each smaller than 180°.

(Function) When the central angles formed between the adjacent beam corresponding light shielding portions are each made to be 180° or larger, a period of time during which the beam corresponding light shielding portion is held in a state where it is lowered below the optical axis by rotating the rotational shade is lengthened, and the clear cut-off line of the light distribution is raised by that extent, leading to the facilitation of generation of glare or dazzling light. On the other hand, since, when the central angles formed between the adjacent beam corresponding light shielding portions are each made to be smaller than 180°, the period of time during which the beam corresponding light shielding portion is held in a state where it is lowered below the optical axis by rotating the rotational shade is shortened, the clear cut-off line of the light distribution is made difficult to be raised and hence the generation of glare or dazzling light becomes difficult.

According to a third aspect of the invention, there is provided a projector type vehicle headlamp as set forth in the first aspect of the invention, wherein central angles formed between the circumferentially adjacent beam corresponding light shielding portions are each made to be 38° or larger.

(Function) When the central angles formed between the adjacent beam corresponding light shielding portions are each made to be smaller than 38°, the plurality of beam corresponding light shielding portions are made to be disposed close to each other near a focal point of the projection lens, and the clear cut-off line of the selected beam becomes unclear. On the other hand, When the central angles formed between the adjacent beam corresponding light shielding portions are each made to be 38° or larger, only the single be am corresponding light shielding portion is made to be disposed near the focal point of the projection lens, and the clear cut-off line of the selected beam becomes clear.

As is clear from the description that has been made heretofore, according to the projector type vehicle headlamp set forth in the first aspect of the invention, the high beam is not emitted in the process where the light distribution is switched over between the low beam and the another beam, and hence there is no risk that oncoming vehicles are dazzled.

In addition, since the light distribution can be switched over speedily between the low beam, which is used most frequently, and the high beam or the other beam, the projector type vehicle headlamp of the invention can contribute to the safety driving of automobiles.

According to the second aspect of the invention, the emission of glare is effectively suppressed in the be am switching over process, and hence there is no risk that oncoming vehicles are troubled.

According to the third aspect of the invention, since the clear cut-off line of the selected beam becomes clear, the visibility is improved.

Further, the emission of glare is effectively suppressed in the beam switching over process, and hence there is no risk that oncoming vehicles are troubled. In addition, the clear cut-off line of the selected beam becomes clear, and hence, the visibility is improved.

DESCRIPTION OF THE PREFERRED EMBODIMENTS

Figure 1:
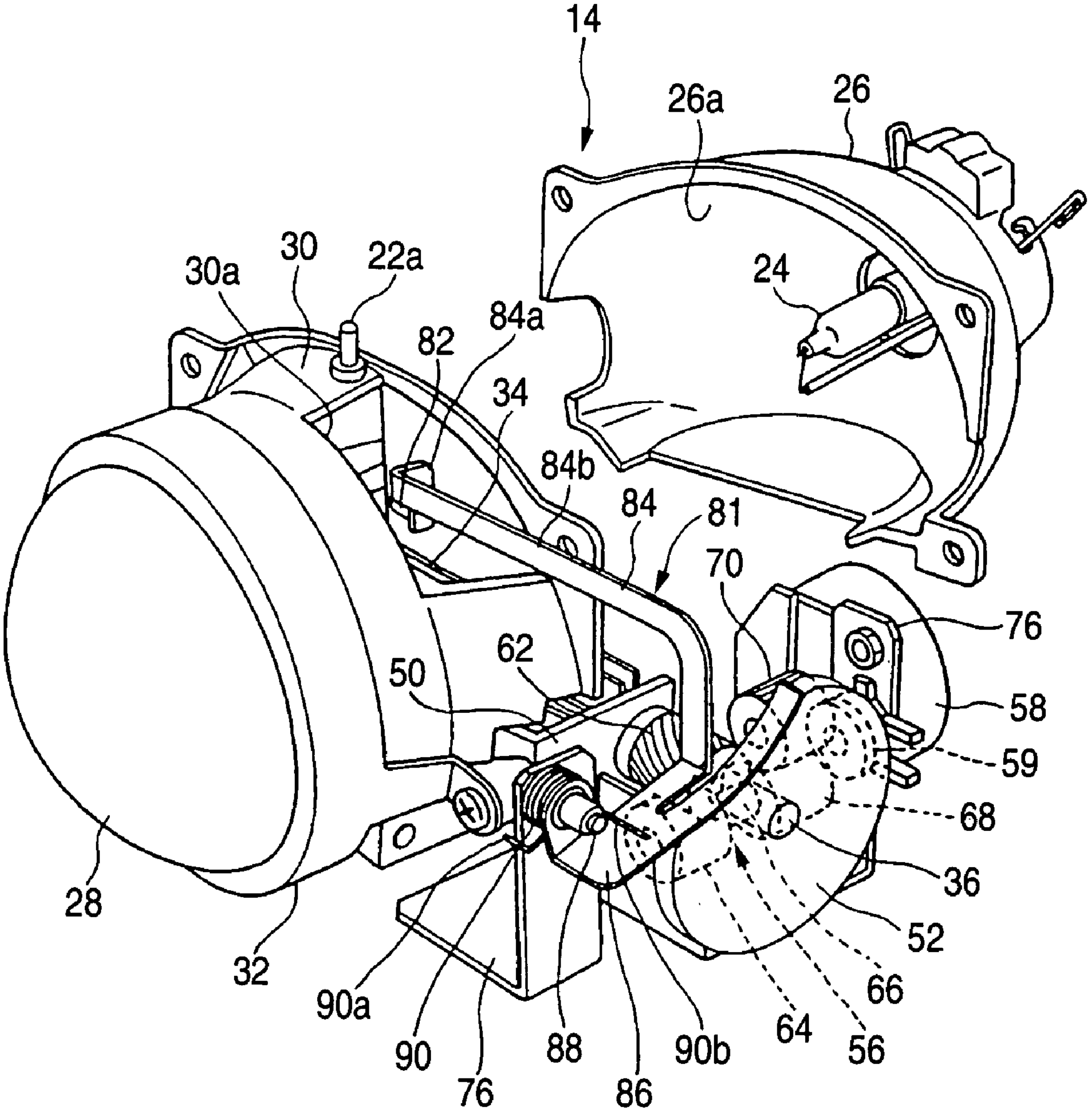
FIG. 1 is an exploded perspective view of a light projecting unit which is a main part of a projector type automobile headlamp according to an embodiment of the invention.
Figure 2:
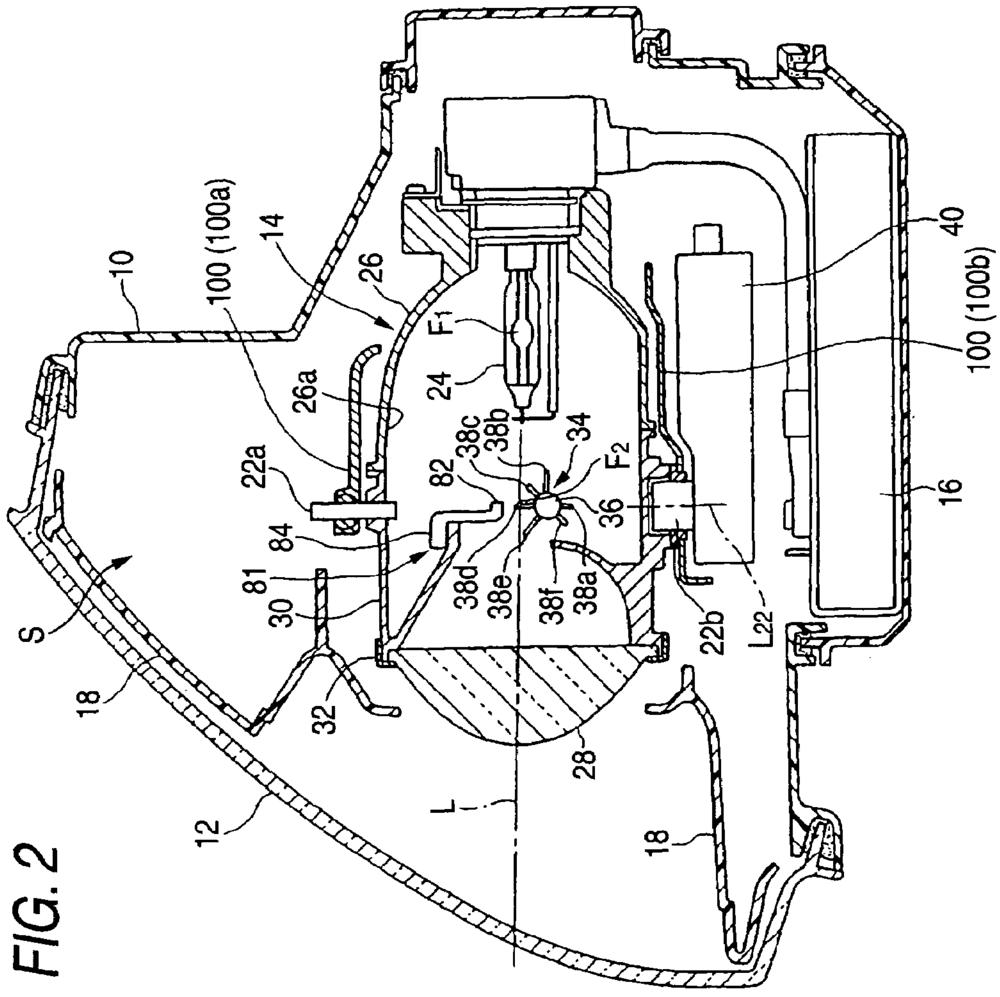
FIG. 2 is a longitudinal sectional view of the same headlamp at an optical axis position thereof.
Figure 3:
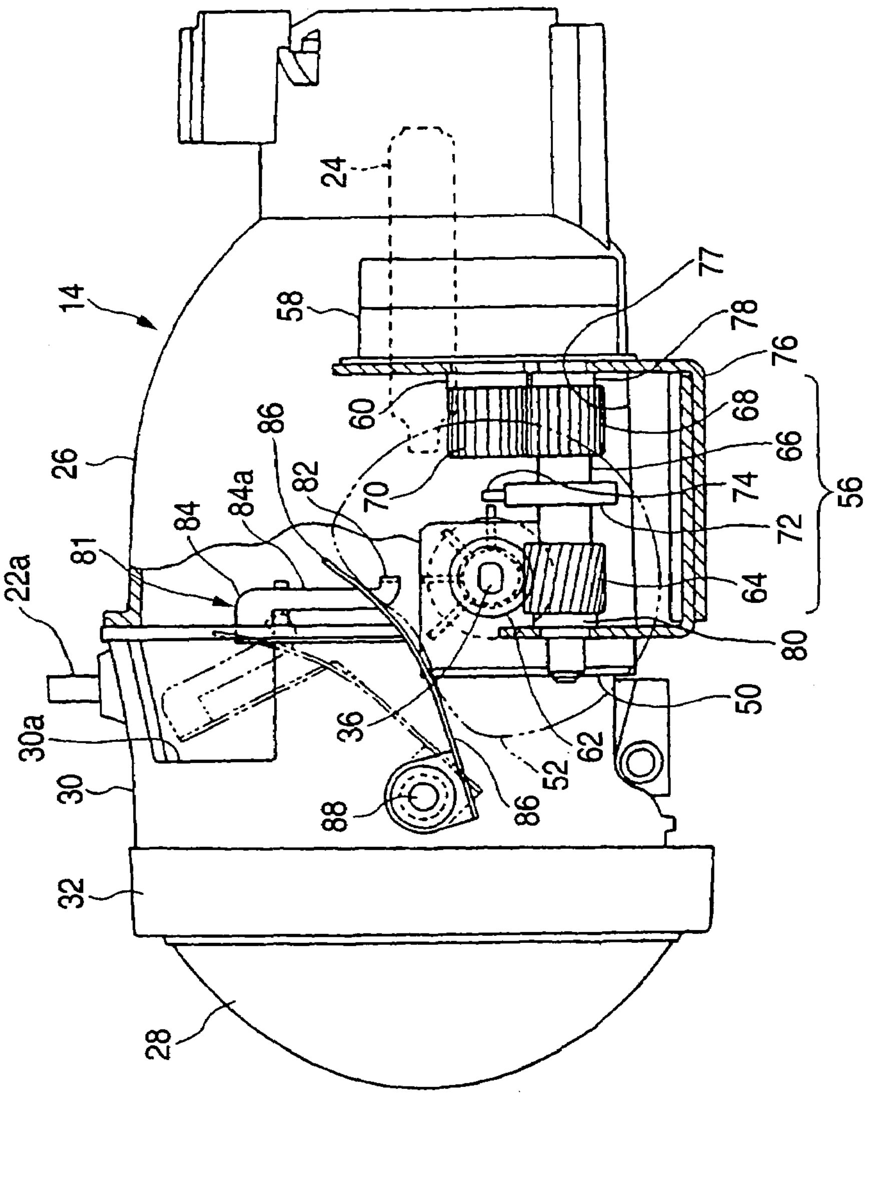
FIG. 3 is a side view of the same light projecting unit.
Figure 4:
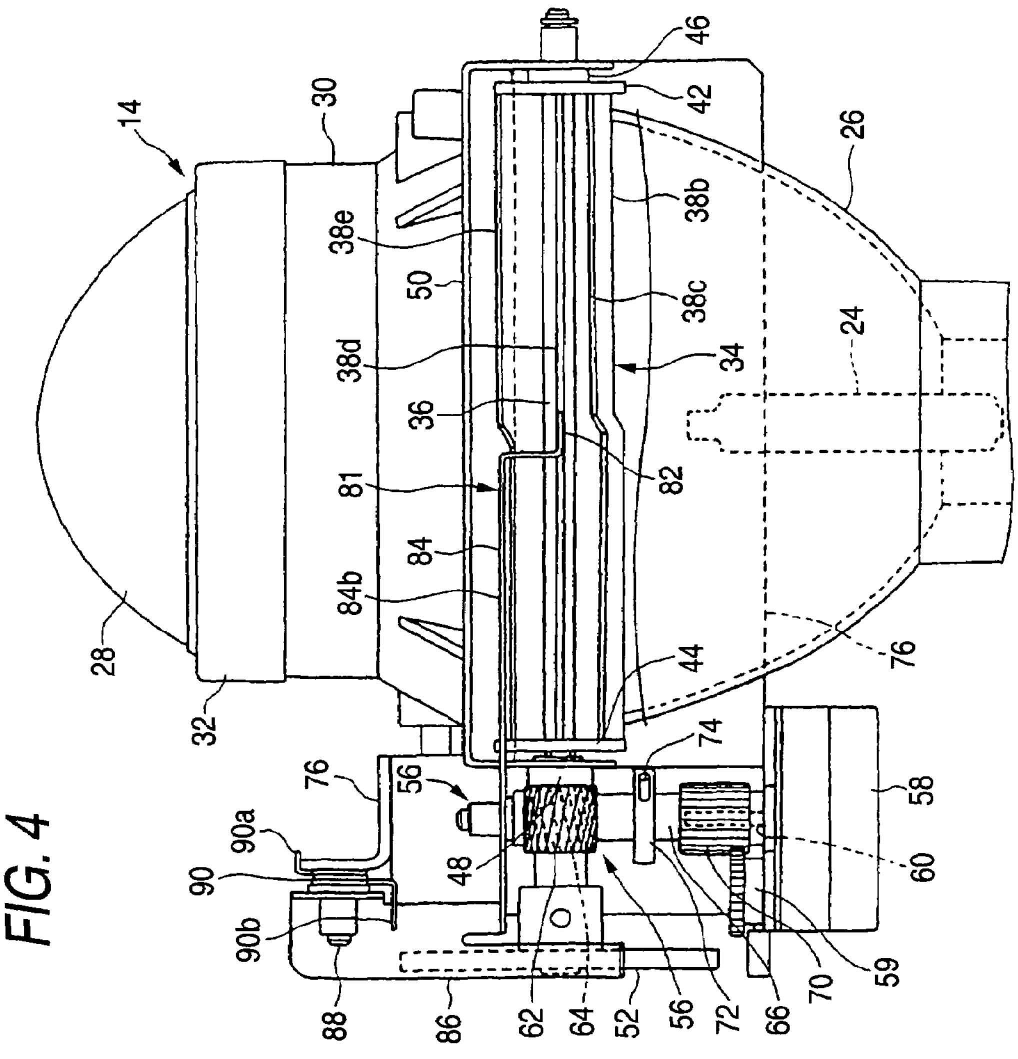
FIG. 4 is a partially sectional plan view of the same light projecting unit.
Figure 5:
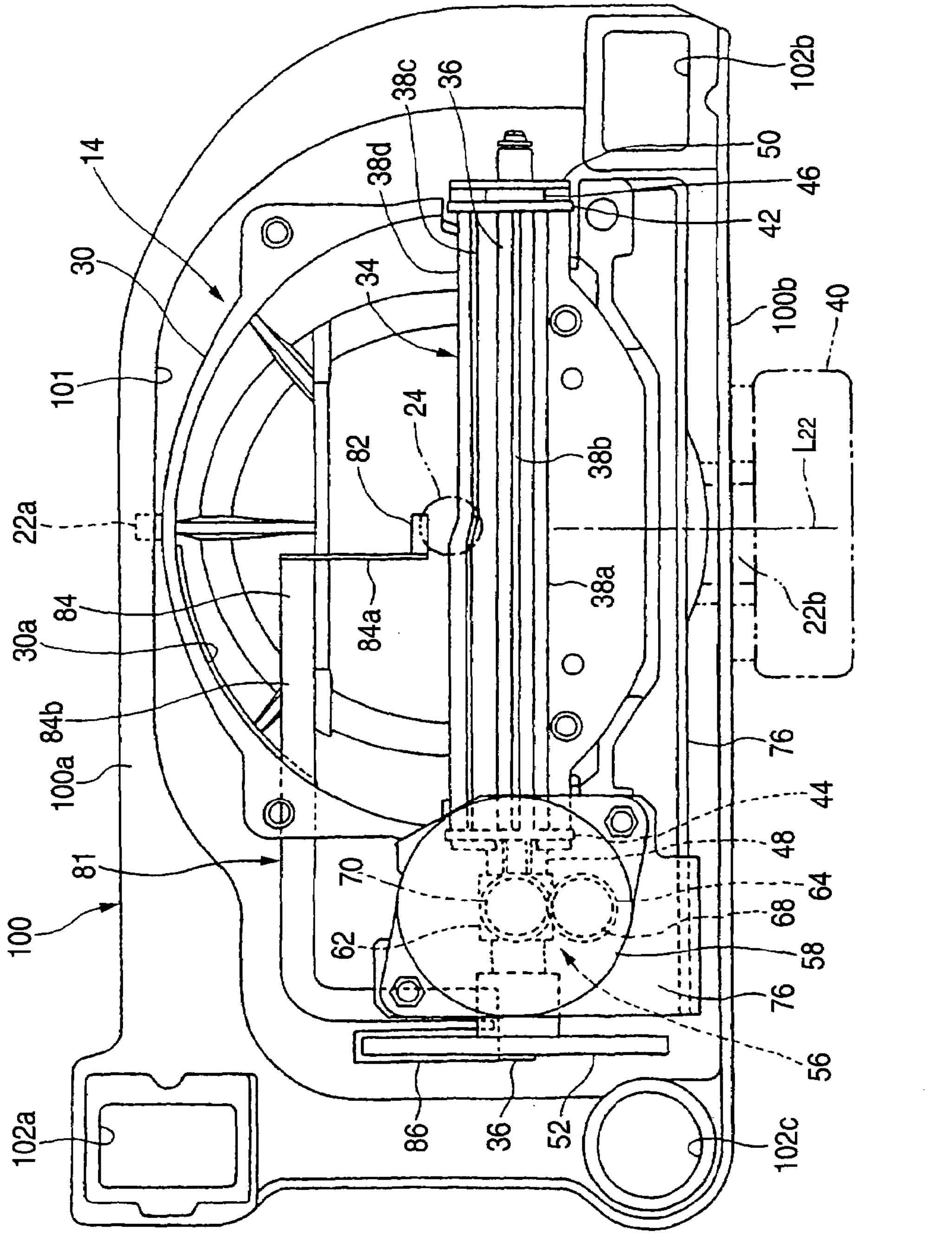
FIG. 5 is a rear view of the same light projecting unit that is integrated into a unit frame with a reflector being removed therefrom, as viewed from the rear.

Next, modes for carrying out the invention will be described based on embodiments of the invention. FIGS. 1 to 5 illustrates a projector type vehicle headlamp of an embodiment of the invention, in which FIG. 1 is an exploded perspective view of a light projecting unit which is a main part of the projector type automobile headlamp, FIG. 2 is a longitudinal sectional view of the same headlamp at an optical axis position thereof, FIG. 3 is a side view of the same light projecting unit, FIG. 4 is a partially sectional plan view of the same light projecting unit, and FIG. 5 is a rear view of the same light projecting unit that is integrated into a unit frame with a reflector being removed therefrom, as viewed from the rear.

In these drawings, a lamp body 10 of the projector type vehicle headlamp is formed into a container-like shape, and a front lens 12 is assembled to a front opening in the lamp body 10 to thereby define a lamp compartment S (refer to FIG. 2). A light projecting unit 14 is accommodated in the lamp compartment S in such a manner that the illumination axis of the headlamp (the optical axis of the light projecting unit 14) L can be tilted for adjustment by an aiming mechanism and that the same optical axis L can be swiveled transversely by a swiveling mechanism.

Namely, a pair of vertical support shafts 22*a*, 22*b* is provided concentrically on the light projecting unit 14, and the support shafts 22*a*, 22*b* are rotatably supported, respectively, on an upper wall 100*a* and a lower wall 100*b* of a unit frame 100 (refer to FIG. 5) which is formed into a substantially rectangular frame as viewed from the front and which is made to open (an opening 101) at the center thereof, whereby the light projecting unit 14 is made to swivel transversely around a swiveling axis L22 (refer to FIGS. 1, 5) relative to the unit frame 100. In addition, the lower support shaft 22*b* is made up of an output shaft of a swiveling actuator 40 fixed to the lower wall 100*b* of the unit frame 100. Then, the support shaft 22*b*, which is the output shaft of the swiveling actuator 40 adapted to rotate forward and backward, is fixedly integrated into (a lens holder 30 of) the light projecting unit 14, whereby the light projecting unit 14 is swiveled transversely by virtue of the driving of the swiveling actuator 40 (the rotation of the support shaft 22*b*). For example, the swiveling actuator 40 is driven in conjunction with the operation of the steering wheel, and the light projecting unit 14 is swiveled in a direction in which the steering wheel is operated and in proportion to an operated amount of the steering wheel, whereby an area ahead of the vehicle in the direction in which the steering wheel is operated is illuminated brightly.

On the other hand, while not shown, the aiming mechanism, which is interposed between the lamp body 10 and the unit frame 100, is mainly made up of tilting fulcrums such as ball joints provided at positions which intersect at right angles with a total of two aiming screws of a transverse aiming screw and a vertical aiming screw when viewed from the front. Then, in FIG. 5 which is a rear view of the light projecting unit 14 which is integrated into the unit frame 100 with a reflector 26 being removed therefrom, as viewed from the rear, a vertically elongated rectangular hole 102*a* in which a nut member adapted to be screwed on the vertical aiming screw is securely inserted is formed in a top left-hand side corner of the unit frame 100, a transversely elongated rectangular hole 102*b* in which a nut member adapted to be screwed on the transverse aiming screw is securely inserted is formed in a bottom right-hand side corner of the unit frame 100, and a circular hole 102*c* in which a tilting fulcrum constituent member such as a ball joint is securely inserted is formed in a bottom left-hand side corner of the unit frame 100. Note that, in this embodiment, while the light projecting unit 14 is supported by the aiming mechanism, in the event that the light projecting unit 14 is supported not by the aiming mechanism but by an automatic leveling mechanism, a slider (not shown), which can be advanced forward and withdrawn backward, of a leveling actuator (not shown) fixed to the lamp body 10 extends forward and a nut member for rotatably supporting a distal end portion of the slider is securely inserted in the hole 102*a*.

Then, when the vertical aiming screw and the transverse aiming screw are operated to rotate, since the unit frame 100 and the light projecting unit 14 are tilted integrally, the illumination axis of the headlamp (the optical axis of the light projecting unit 14) L can be tilted for adjustment (aimed) vertically and transversely by means of the vertical aiming screw and the transverse aiming screw. Reference numeral 18 denotes an extension frame which is disposed so as not to interfere with the unit frame 100 (the light projecting unit 14) which can be tilted for adjustment and swiveled.

The light projecting unit 14 is integrally made up of an aluminum die-cast reflector 26 which is formed into a substantially cup-like shape which is made to open on a front side where a discharge bulb 24 is securely inserted and which exhibits a substantially oval shape when viewed from the front, a projection lens 28 disposed forward of the reflector 26 and an aluminum die-cast lens holder 30 which is formed into a cylindrical shape and which is fixedly screwed to a front side of the reflector 26 at an axially rear end portion thereof, and an annular metal fixture 32 for grabbing the projection lens 28 is fixedly screwed to the lens holder 30.

An aluminum deposited oval reflecting surface 26*a* is formed on an interior side of the reflector 26, the oval reflecting surface 26*a* so formed has a primary focal point F1 and a secondary focal point F2, and a discharge center of the discharge bulb 24 is positioned at the primary focal point F1. In addition, a metallic (for example, aluminum) rotational shade 34 is provided at a focal point of the projection lens 28 near the secondary focal point F2 for forming a clear cut-off line by partially shielding light which is reflected on the reflector 26 to thereby be directed towards the projection lens 28. Emergent light from the bulb 24 which is reflected on the reflector 26 is made to converge on the rotational shade 34 and the light so made to converge is then guided to the front of the rotational shade 34 so as to be projected and distributed as substantially parallel light ahead of the headlamp.

The rotational shade 34 is made up of a rotational axis 36 which is disposed in a direction which intersects substantially at a right angle with the illumination axis of the headlamp (the optical axis of the projection lens 28) L and a plurality of light shielding plates 38 (38*a*, 38*b*, 38*c*, 38*d*, 38*e*, 38*f*) which are disposed at a predetermined interval (angle) in a circumferential direction of the rotational axis 36. That is, the plurality of light shielding plates 38 are radially disposed on the rotational axis 36 of the rotational shade 34. The shape and arrangement of the light shielding plates 38*a* to 38*f* will be described in detail later on. Then, the rotational shade 34 (the rotational axis 36) rotates forward and backward by virtue of the driving of a stepping motor 58, and every time the respective light shielding plates 38 are brought to the position of the illumination axis (optical axis) L, clear cut-off lines corresponding to light distribution patterns formed by the respective light shielding plates are formed.

To be specific, as shown in FIGS. 3 to 5, disks 42, 44 for supporting the respective light shielding plates 38*a* to 38*f* are fixed to ends of the rotational axis 36, respectively, and portions of the rotational axis 36 which are situated outwardly of the respective disks 42, 44 are rotatably supported on a metallic bearing bracket 50 which extends across the lens holder 30 via bearings 46, 48. This bearing bracket 50 is fixedly screwed to the lens holder 30, and the bearings 46, 48 are inserted into a through hole (not shown) formed in the bearing bracket 50 together with the rotational axis 36. A wet cam 52, which is a metallic eccentric cam, is rotatably secured to an axial end of the rotational axis 36, and a drive force transmitting mechanism 56 is interposed between the wet cam 52 and the bearing 48.

The drive force transmitting mechanism 56 is interposed between the stepping motor 58 and the rotational shade 34, and the stepping motor 58 is, as shown in FIG. 4, disposed in an area on a side of the reflector 26 or an area in the vicinity of a curbed portion of the reflector 26. This stepping motor 58 is made as a drive source for generating a drive force for driving to rotate the rotational shade 34, and an output shaft 60 thereof is disposed in a direction to intersect with the rotational axis 36 of the rotational shade 34 at right angles. In transmitting the drive force of the stepping motor 58 to the rotational axis 36 via the drive force transmitting mechanism 56, the drive force transmitting mechanism 56 is made up using a plurality of gear trains.

Namely, the drive force transmitting mechanism 56 is made up of a helical gear (a primary helical gear) 62, formed of brass, which is rotatably secured to the rotational axis 36 of the rotational axis, a helical gear (a secondary helical gear) 64, formed of synthetic resin, which is positioned underneath the helical gear 62 so as to mesh with the helical gear 62, a connecting shaft 66, formed of brass, which is connected to the helical gear 64, a spur gear 68, formed of brass, which is connected to an axial end portion of the connecting shaft 66 and a spur gear 70, formed of brass, which meshes with the spur gear 68 and which is rotatably secured to the output shaft 60 of the stepping motor 58. Then, a metallic disk 72 (refer to FIGS. 3, 4) is fixed substantially to an intermediate portion of the connecting shaft 66, and a metallic stopper pin 4 is provided on an outer circumference of the disk 72 in such a manner as to protrude therefrom. The helical gear 64 is formed of a resin (for example, PEEK resin or nylon resin) which can provide a heat resistance required for an intermediate gear when taking the function thereof into consideration. The spur gear 70, which functions as a drive gear, transmits the drive force of the stepping motor to the spur gear 68, which functions as a follower gear, the drive force so transmitted to the spur gear 68 is transmitted to the helical gear 64 via the connecting shaft 66, and the drive force so transmitted to the helical gear 64 is then transmitted to the rotational shade 34 (the rotational axis 36) via the helical gear 62. As this occurs, the direction of the drive force so transmitted is changed through 90° by the helical gear 62 and the helical gear 64. Namely, the pair of helical gears 62, 64 makes up an orthogonal direction change gear set.

Figure 6C:
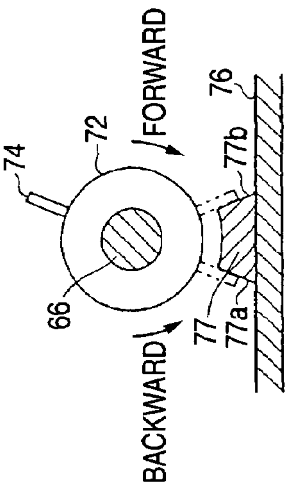
FIG. 6C is a drawing showing a stopper pin and a stopper portion which restrict the rotational range of the rotational shade.
Figure 7A:
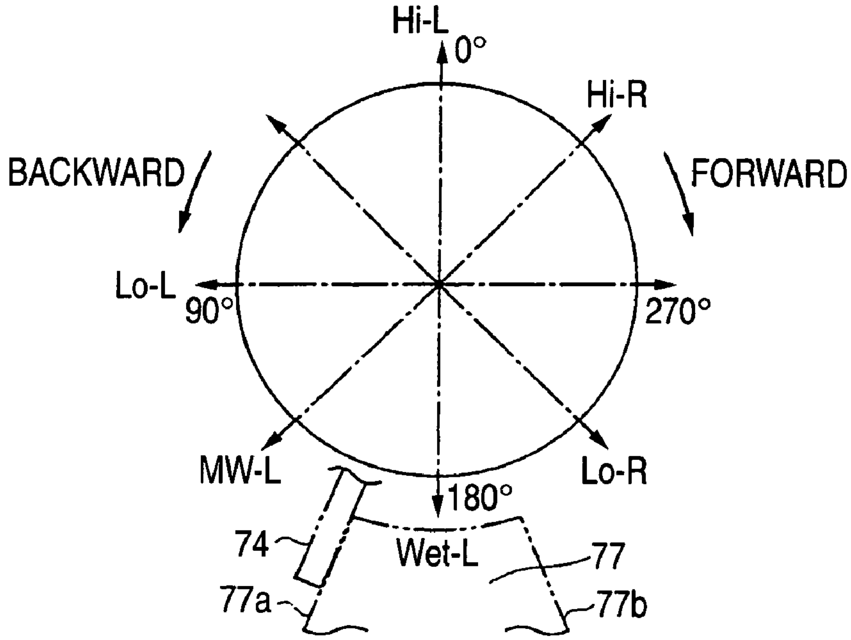
FIGS. 7A and 7B are drawings which explain a relation between the rotational directions of the rotational shade and beams.

In addition, the stepping motor 58 is fixed to a motor bracket 76 which is fixed, in turn, to the lens holder 30, and the connecting rod 66 which connects the spur gear 68 with the helical gear 64 is rotatably supported by gearings 78, 80 (refer to FIG. 3) which are securely inserted in the motor bracket. As shown in FIGS. 3, 4 and 6C, a stopper portion 77 (77*a*, 77*b*) is formed on the motor bracket 76 in such a manner as to protrude therefrom into a rotational path of the stopper pin 74 so as to be brought into abutment with the stopper pin 74 to thereby stop the same pin, and when the rotational shade 34 (the connecting shaft 66) rotates forward, the stopper 74 is, as shown in FIGS. 6C and 7C, brought into abutment with a side 77*b* of the stopper portion 77, whereby a further rotation of the rotational shade 34 (the connecting rod 66) is prevented, whereas, on the other hand, when the rotational shade 34 (the connecting shaft 66) rotates backward, the stopper pin 74 is, as shown in FIGS. 6C and 7A, brought into abutment with the other side 77*a* of the stopper portion 77, whereby a further rotation of the rotational shade 34 (the connecting shaft 66) is prevented. Namely, while the rotational shade 34 (the connecting shaft 66) can rotate in a range of, for example, 0 to 315 degrees, a further rotation than the range is prevented by virtue of the abutment of the stopper pin 74 with the stopper portion 77 (77*a*, 77*b*), whereby an initialization for correcting a positional deviation in controlling the drive of the stepping motor 58 can be implemented. Note that reference numeral 59 shown in FIGS. 1, 4 denotes a position detector (a potentiometer) for detecting the rotational angle of the stepping motor 58.

On the other hand, a wet shade main body 82 having a rectangular shape when viewed from the front is disposed above the rotational shade 34 in such a manner as to freely move vertically. The wet shade main body 82 can swivel around a pin 88, as a fulcrum, which is provided at a position on a side of the lens holder 30 and is integrally formed on a distal end of a swiveling arm 84 having a U-shape when viewed from the front which is disposed across a notch 30*a* formed in the side of the lens holder 30. This wet shade 82 is lowered (suspended) into an area in the vicinity of the illumination axis (the optical axis) L as a rain driving shade only when a light distribution patter for rain driving is formed and is moved to a lens holder 30 side which is largely apart upwardly from the rotational shade 34 at any other opportunities than rain so as to have no effect on light distribution patterns formed.

In addition, a proximal end of the swiveling arm 84 is connected to a belt-like curved cam follower 86 made up of a leaf spring. To be specific, the wet shade main body 82 and the swiveling arm 84 which make up a wet shade 81 and the cam follower 86 are integrated into a leaf spring-like sheet metal structure. Then, a distal end of the cam follower 86 is pressed against by an outer circumferential surface of the wet cam 52, and a proximal end thereof is fixed to the motor bracket 76 via the pin 88.

Namely, a coil spring 90 is mounted between a proximal portion of the cam follower 86 and the motor bracket 76, and one end 90*a* of the coil spring 90 is locked on the motor bracket 76 and the other end 90*b* thereof is locked on an upper side of the cam follower 86 and a spring force (elastic force) of the coil spring 90 acts in a direction in which the cam follower 86 presses against the outer circumferential surface of the wet cam 52.

This wet cam 52 rotates forward and backward together with the rotational shade (the rotational axis 36), and while the cam follower 86 is in contact with the outer circumferential surface of the wet cam 52 on a major diameter side thereof, as shown in imaginary lines in FIG. 3, the wet main body 82 is disposed at a position apart from the rotational shade 34 (a position largely apart upwardly from the rotational shade 34), whereas, on the other hand, when the cam follower 86 is brought into contact with the outer circumferential surface of the wet cam 52 on a minor diameter side thereof, as shown in solid lines in FIG. 3, the wet shade main body 82 is suspended in a vertical direction so as to be disposed closely above the rotational shade 34, and at the same time, the light shielding plate 38*d* is positioned near the illumination axis (the optical axis) L.

Namely, the wet shade main body 82 is integrated into the cam follower 86 which follows the outer circumferential surface of the wet cam 52 via the swiveling arm 84, and the wet cam 52 interlocks with the rotation of the rotational shade 34 based on a light distribution switching over operation for emitting a beam for rainy weather, so that the minor diameter side of the wet cam 52 is brought into abutment with the cam follower 86, whereas the wet cam 52 interlocks with the rotation of the rotational shade 34 based on a light distribution switching over operation for emitting any other beam than the beam for rainy weather, so that the major diameter side of the wet cam 52 is brought into abutment with the cam follower 86. Then, the swiveling arm 84 extends from a connecting point with the cam follower 86 as a fulcrum to above the rotational shade 34 so as to support the wet shade main body 82 such that the wet shade main body 82 is suspended down to a light passage area when the cam follower 86 is brought into abutment with the minor diameter side of the wet cam 52, whereas the set shade main body 82 is raised to a withdrawal area when the cam follower 86 is brought into abutment with the major diameter side of the wed cam 52. Due to this, the wet cam 52 rotates by interlocking with the rotation of the rotational shade 34 in association with the driving of the stepping motor 58 and the wet shade main body 82 fluctuates between the light passage area and the withdrawal area in accordance with the rotational position of the rotational shade 34 (the wet cam 52), whereby the position of the wet shade main body 82 can be controlled by the rotational shade 34 rotating stepping motor 58.

In addition, the swiveling arm 84 is formed in such a manner as to bridge over the light passage area above the rotational shade 34, and when swiveling, even in the event that the wet shade main body 82 is made to be disposed within the light passage area, the swiveling arm 84 is held in a state where the swiveling arm 84 bridges over the light passage area so as not to shield light which passes through the light passage area above the rotational shade 34 towards the projection lens 28.

Furthermore, a location 84*a* at a distal end of the swiveling arm 84 which supports vertically the wet shade main body 82 from above curves in such a manner as to intersect with a horizontal area 84*b* of the swiveling arm 84 and a widthwise direction thereof coincides with the optical axis L direction. Due to this, while light in the light passage area is shielded by the distal end location 84*a* of the swiveling arm 84 only by an amount equal to an area corresponding to the thickness thereof, the amount of light so shielded can be ignored in consideration of the formation of a light distribution.

Figure 6A:
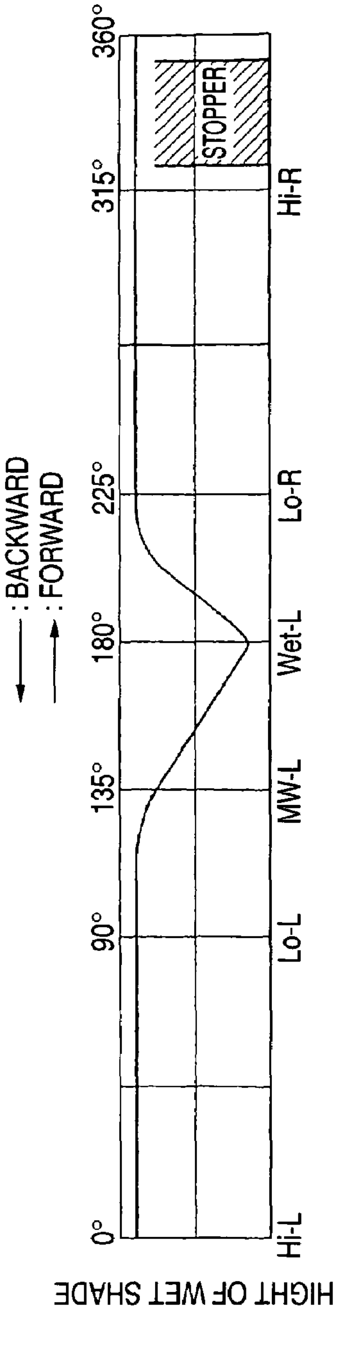
FIG. 6A is a drawing which explains a change in height of a wet cam which interlocks with the rotation of a rotational shade.
Figure 6B:
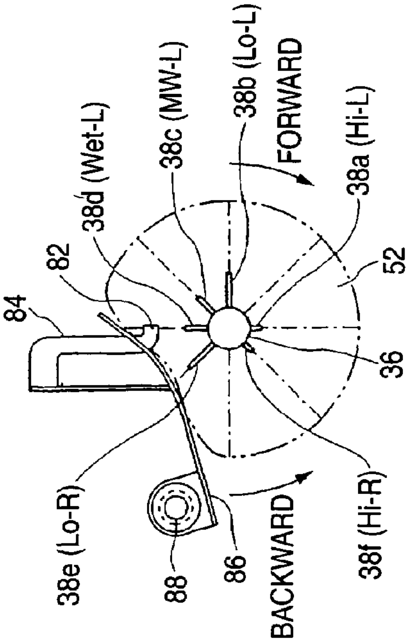
FIG. 6B is a drawing which explains a relation among the wet cam, a cam follower and the rotational shade (light shielding plates thereof).

In addition, the light shielding plates 38*a* to 38*f* of the rotational shade 34 which are disposed in a radial fashion relative to the rotational axis 36 are, as shown in FIG. 6, disposed circumferentially in a counterclockwise direction at angular intervals such that with the light shielding plate 38*a* being disposed at a position which is to constitute a reference position, the light shielding plate 38*b* is apart 90 degrees, the light shielding plate 38*c* is apart 135 degrees, the light shielding plate 38*d* is apart 180 degrees, the light shielding plate 38*e* is apart 225 degrees, and the light shielding plate 38*f* is apart 315 degrees from the reference position, respectively. This indicates that when the rotational shade 34 rotates forward 180 degrees from an initial position shown in FIG. 7A and the light shielding plate 38*d* is, as shown in FIG. 6B, positioned closest to the optical axis L, the cam follower 86 is brought into contact with the outer circumferential surface of the wet cam 52 on the minor diameter side thereof, whereby the wet shade main body 82 is suspended in the vertical direction so as to be disposed above near the rotational shade 34.

In this case, the light shielding plate 38*a* corresponds to a high beam Hi-L for left-hand side traffic, the light shielding plate 38*b* corresponds to a low beam Lo-L for left-hand side traffic, the light shielding plate 38*c* corresponds to an expressway beam MW-L for left-hand side traffic, the light shielding plate 38*d* corresponds to a rain beam (a wet beam) Wet-L for left-hand side traffic, the light shielding plate 38*e* corresponds to a low beam Lo-R for right-hand side traffic and the light shielding plate 38*f* corresponds to a high beam Hi-R for right-hand side traffic, and when a light distribution switching over operation is performed by the driver for emitting any of the beams, the rotational shade 34 is designed to rotate in replay to the operation so performed. That is, the light shielding plate 38*b* or the light shielding plate 38*e* constitutes a first light shielding portion 38*b*, 38*e* for the low beam, the light shielding plate 38*a* or the light shielding plate 38*f* constitutes a second light shielding portion 38*a*, 38*f* for the high beam, and the light shielding plate 38*c* or the light shielding plate 38*d* constitutes a third light shielding portion 38*c*, 38*d* for an another beam.

Namely, the stepping motor 58 is connected to a control circuit (not shown) via a lead wire (not shown), and a signal is inputted into the control circuit from a light distribution switching over switch (not shown) which is to be operated by the driver. Then, for example, as shown in FIG. 7A, when the driver performs light distribution switching over operations to select beams to be emitted from the initial position for forming the left-hand side traffic high beam Hi-L in the order of the left-hand side traffic low beam Lo-L, the same traffic expressway beam MW-L, the same traffic rain beam (wet beam) Wet-L, the right-hand side traffic low beam Lo-R and the same traffic high beam Hi-R, pulse signals in accordance with the operational positions on the operation switch are outputted sequentially from the control circuit to the stepping motor 58, whereby the stepping motor 58 rotates forward, and the respective light shielding plates 38*a* to 38*f* are moved to the positions near the illumination axis (the optical axis) L sequentially in the process where the stepping motor 58 rotates forward.

To be specific, in the event that operations are performed to rotate the rotational shade 34 forward sequentially from the position for forming the left-hand side traffic low beam Lo-L shown in FIG. 7, when the left-hand side traffic low beam Lo-L is selected, the light shielding plate 38*b* is positioned near the optical axis L, next, when the left-hand side traffic expressway beam MW-L is selected, the light shielding plate 38*c* is positioned near the optical axis L, and next, when the left-hand side traffic rain beam (wet beam) Wet-L is selected, the light shielding plate 38*d* is positioned near the optical axis L. Furthermore, when the right-hand side traffic low beam Lo-R is selected, the light shielding plate 38*e* is positioned near the optical axis L, and thereafter, furthermore, when the right-hand side high beam Hi-R is selected, the light shielding plate 38*f* is positioned near the optical axis L.

As this occurs, the wet shade main body 82 is in a state where the wet shade main body 82 is disposed so as to move in the area above the rotational shade 34 between the light passage are a where light reflected on the reflector 26 is directed towards the projection lens 28 and the withdrawal area which deviates from the light passage area, and when the light distribution switching over operation for emitting the rain beam is performed, interlocking with the rotation of the rotational shade 34, the wet shade main body 82 is lowered to be suspended from the withdrawal area to the light passage area so as to shield, of light reflected on the reflector 26 to thereby be directed towards the projection lens 28, light illuminating part of the road surface in front of the vehicle. Due to this, when it is raining or foggy, there is caused no problem that light illuminating portions of the road surface in front of and on sides of the vehicle is reflected white due to the light so emitted from the headlamps being too intense and hence, the entirety of relevant portions of the road surface is made difficult to be seen or that oncoming vehicles are dazzled by glare generated by reflected light on the relevant portion of the road surface in front of the vehicle.

Figure 7B:
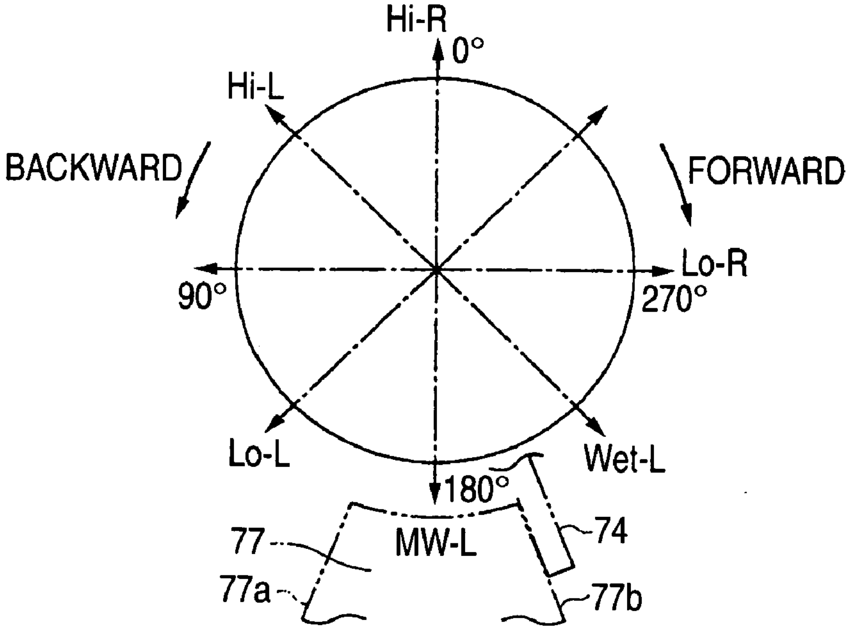

On the other hand, in the event that operations are executed to rotate the rotational shade 34 backwards sequentially from a right-hand side traffic high beam Hi-R forming position shown in FIG. 7B, when beams to be emitted are selected in the order of the right-hand side traffic low beam Lo-R, the left-hand side traffic rain beam (wet beam) Wet-L, the left-hand side traffic expressway beam MW-L, the left-hand side low beam Lo-L and the left-hand side traffic high beam Hi-L, pulse signals in accordance with the operational positions on the operation switch are outputted sequentially from the control circuit to the stepping motor 58, whereby the stepping motor 58 rotates backwards, and in the process where the stepping motor 58 is rotating backwards, the respective light shielding plates are moved to the positions near the illumination axis (the optical axis) L in the order of the light shielding plates 38*f*, 38*e*, 38*d*, 38*c*, 38*b* and 38*a*.

Also, in this case, when the light distribution switching over operation for emitting the rain beam is performed, interlocking with the rotation of the rotational shade 34, the wet shade main body 82 is lowered to be suspended from the withdrawal area to the light passage area so as to shield, of light reflected on the reflector 26 to thereby be directed towards the projection lens 28, light illuminating part of the road surface in front of the vehicle, so that, when it is raining or foggy, there is caused no problem that light illuminating portions of the road surface in front of and on sides of the vehicle is reflected white due to the light so emitted from the headlamps being too intense and hence, the entirety of relevant portions of the road surface is made difficult to be seen or that oncoming vehicles are dazzled by glare generated by reflected light on the relevant portion of the road surface in front of the vehicle.

Figure 8A:
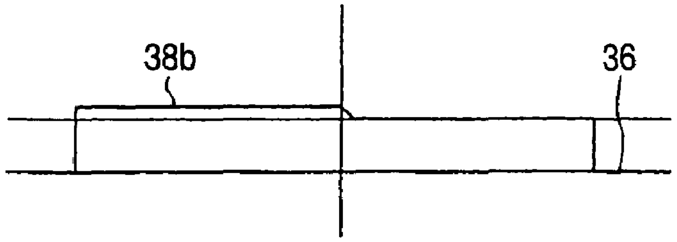
FIGS. 8A to 8E are drawings which explain shapes of the light shielding plates in accordance with light distribution patterns.
Figure 8B:
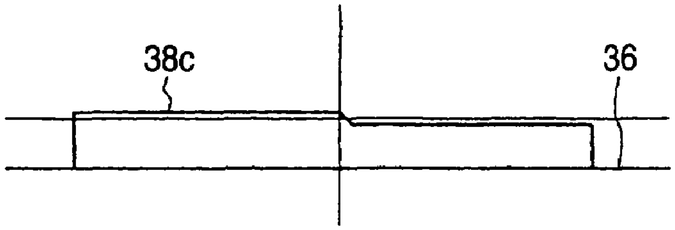
Figure 8C:
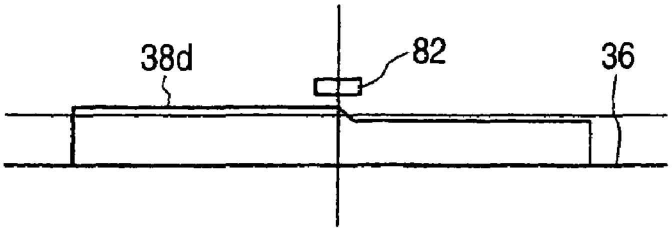
Figure 8D:
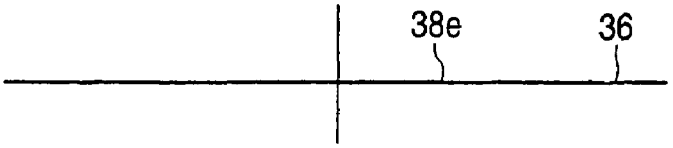
Figure 8E:
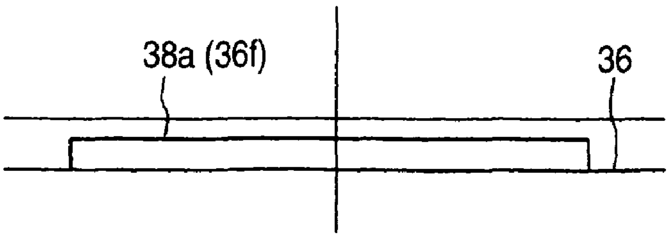

Next, the shapes of the light shielding plates 38 on the rotational shade 34 resulting when seen from the reflector 26 side to the projection lens 28 side are shown in FIGS. 8A to 8E. FIG. 8A shows the shape of the light shielding plate 38*b* for forming the left-hand side traffic low beam Lo-L. FIG. 8B shows the shape of the light shielding plate 38*c* for forming the left-hand side traffic expressway beam MW-L. FIG. 8C shows the shape of the light shielding plate 38*d* for forming the left-hand side rain beam (wet beam) Wet-L and a positional relation with the wet shade main body 82. FIG. 8D shows the shape of the light shielding plate 38*e* for forming the right-hand side traffic low beam Lo-R. FIG. 8E shows the shapes of the light shielding plates 38*a*, 38*f* for forming the left-hand side traffic and right-hand side traffic high beams Hi-L, Hi-R.

Figure 9A:
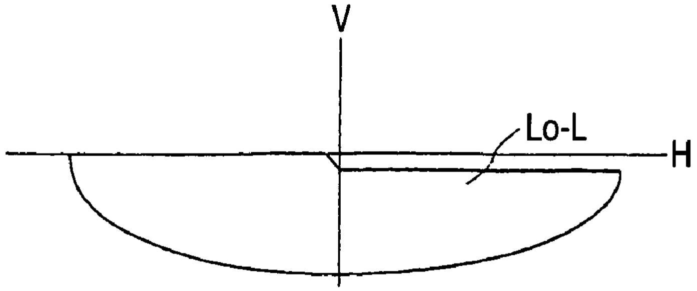
FIGS. 9A to 9E are drawings which explain light distribution patterns which are illuminated on a screen.
Figure 9B:
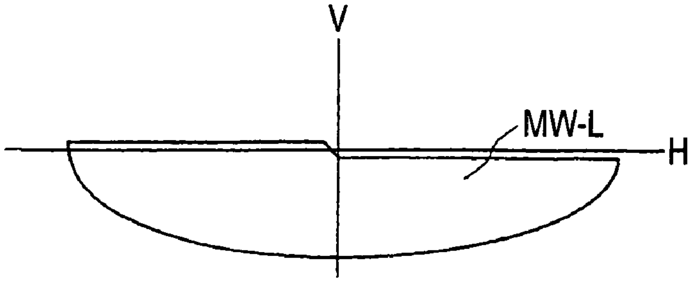
Figure 9C:
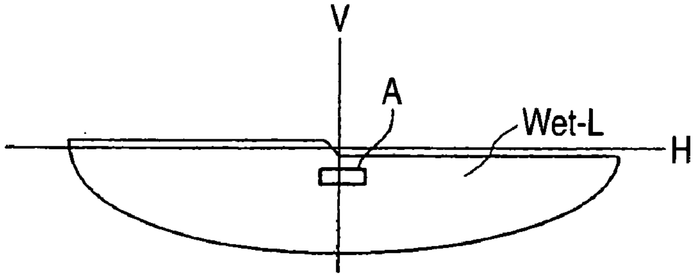
Figure 9D:
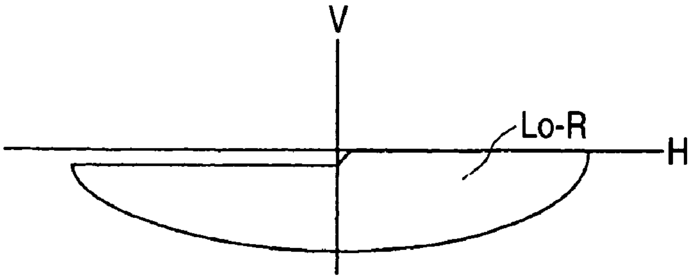
Figure 9E:
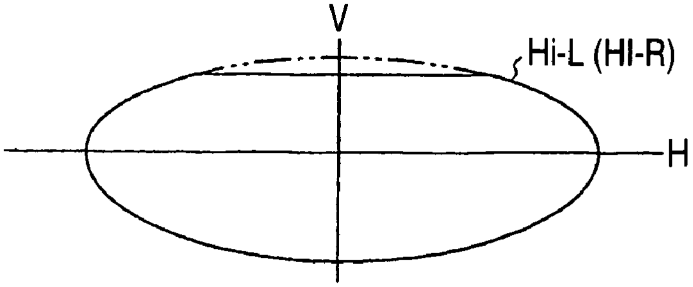
Figure 10A:
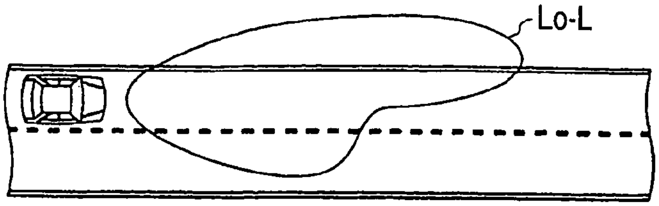
FIGS. 10A to 10E are drawings which explain light distribution patterns which are illuminated on the road surface.
Figure 10B:
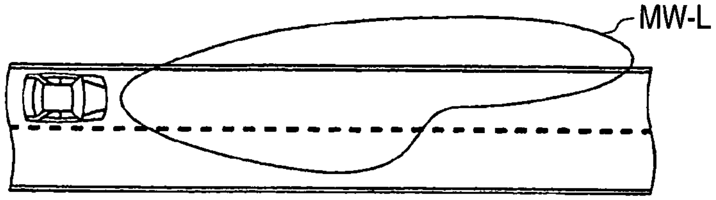
Figure 10C:
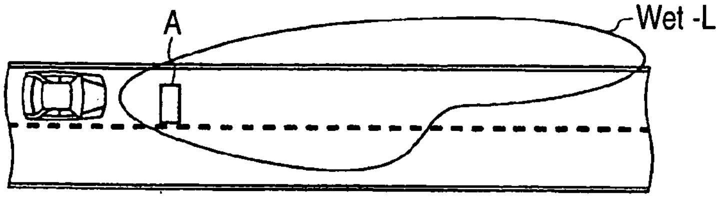
Figure 10D:
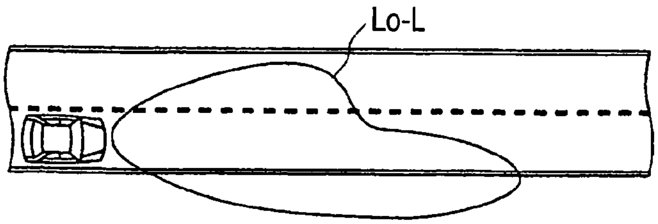

Next, light distribution patterns corresponding to the shapes of the shades shown in FIGS. 8A to 8E which would result when illuminated on a screen are shown in FIGS. 9A to 9E, and light distribution patterns so corresponding to the shade shapes which would result when illuminated on the road surface are shown in FIGS. 10A to 10E. In FIGS. 9, 10A and 10D, the respective light distribution patterns are the same except that they are different only in side of the traffic or between the left-hand side traffic and the right-hand side traffic. In FIGS. 9, 10B and 10C, while the light distribution patterns formed by the light shielding plates are identical, in FIG. 10C, due to the wet shade main body 82 existing, an area A darker than the other areas is formed in the near field illuminated area in front of the vehicle, whereby a risk can be avoided that the beam is reflected on the wet road surface to generate a glare which dazzles oncoming vehicles. In addition, in FIGS. 9 and 10E, both for the left-hand side traffic and the right-hand side traffic, the high beams show the same pattern which is distributed over a wide range extending from the near to far field illuminated areas ahead of the vehicle.

In addition, in this embodiment, the light shielding plates 38*a* to 38*e* are disposed adjacent to one another at the predetermined angular intervals in the circumferential direction of the rotational shade 34 so as to correspond to the predetermined beams, and the following points are taken into consideration when devising the configuration.

Firstly, easy operation by the driver in switching over the light distributions is taken into consideration.

Namely, to cope with a case where the vehicle needs to be driven from a country where the left-hand side traffic is mandatory to a country where the right-hand side traffic is mandatory across a boundary therebetween, the left-hand side traffic light shielding plates 38*a* to 38*d* and the right-hand side traffic light shielding plates 38*e*, 38*f* are disposed continuously in the circumferential direction on the rotational shade 34, so that the light distribution patterns can be changed over simply and speedily between the left-hand side traffic light distribution and the right-hand side traffic light distribution.

In addition, the high beam corresponding light shielding plate 38*a* (38*f*) is provided in adjacent to the low beam corresponding light shielding plate 38*b* (38*e*), which is used most frequently, so that a speedy switching over can be implemented between low beam and high beam.

Since the low beam corresponding light shielding plate 38*b* (38*e*) is disposed adjacent to the high beam corresponding light shielding plate 38*a* (38*f*), while, in the event that an interval between both the light shielding plates 38*b* (38*e*) and 38*a* (38*f*) is narrow, there may be caused a risk that the high beam (light distribution pattern) that is formed by the high beam corresponding light shielding plate 38*a* (38*f*) which is shorter in height is affected by the light shielding action of the low beam corresponding light shielding plate 38*b* (38*e*) which is taller in height to thereby make it difficult for an appropriate high beam to be formed, according to the embodiment, in order to form an appropriate high beam, the low beam corresponding light shielding plate 38*b* (38*e*) and the high beam corresponding light shielding plate 38*a* (38*f*) are disposed largely apart from each other in the circumferential direction at the angular interval of 90 degrees.

Secondly, with a view to forming a clear cut-off line and preventing the generation of glare in switching over the light distributions, the adjacent light shielding plates 38*b* to 38*e* are disposed at a predetermined angular interval (45 degrees).

Figure 11:
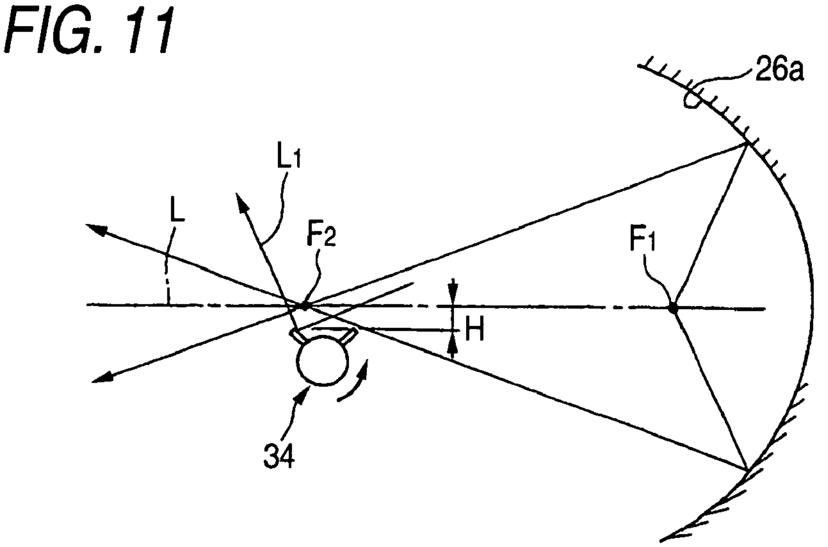
FIG. 11 is a drawing which explains a problem caused when the adjacent light shielding plates are disposed so as to be largely apart from each other on the rotational shade.

Namely, in the event that the intervals between the adjacent light shielding plates 38 are to narrow, the plurality of light shielding plates 38 are made to be disposed close to one another near the focal point of the projection lens 28, whereby the clear cut-off line of the selected beam becomes unclear. On the contrary, in the event that the intervals between the adjacent light shielding plates 38 are to wide, in switching over the corresponding light shielding plates 38 (the light distribution of the beams are switched over or the rotational shade 34 is rotated), as shown in FIG. 11, there is created a state where the position of a side edge portion of the light shielding plate 38 is lowered from the optical axis by H, and this raises the clear cut-off line by such an extent, generating a glare which dazzles oncoming vehicles. Furthermore, in switching over the corresponding light shielding plates 38 (the light distribution of the beams are switched over or the rotational shade 34 is rotated), there may be a risk that a glare is generated by a reflected light L1 reflected on the surface of the light shielding plate which is inclined to the front forward of the focal point of the projection lens 28.

Then, according to experiments by the inventor, et al, the following facts were verified: in order to avoid the fact that the clear cut-off line of the selected beam is unclear, it is desirable that the angular intervals between the adjacent light shielding plates 38 are each 38 degrees or larger; additionally, in order to suppress the increase in level of the clear cut-off line due to the descent of the position of the side edge location of the light shielding plate 38 and hence the generation of glare which dazzles oncoming vehicles, it is desirable that the central angles formed between the circumferentially adjacent beam corresponding light shielding plates 38, 38 are each smaller than 180 degrees; and furthermore, in order to be effective in suppressing the generation of glare generated by light reflected on the surface of the front-inclined light shielding plate in switching over the light distributions of the beams, it is desirable that the angular intervals between the adjacent light shielding plates 38 are each 60 degrees or smaller. In addition, the following were also verified: in order to avoid the fact that the clear cut-off line of the selected beam becomes unclear, it is effective that the distal end portion (the side edge portion) of the light shielding plate 38 is formed into an edge-like shape, and in order to suppress the reflection on the surface of the light shielding plate 38, it is effective that the light shielding plates 38 are treated with anodized aluminum or blackening.

Due to this, in the embodiment, by treating the light shielding plates 38*a* to 38*f* with anodized aluminum and setting the angular intervals (disposing angles) between the adjacent light shielding plates 38*b* to 38*e* each to 45 degrees, it is possible to form the left-hand side traffic low beam, the same traffic expressway beam, the same traffic rain beam and the right-hand side traffic low beam each having a clear cut-off line which is clear, and even in switching over the light distributions among these beams, no glare is produced in the middle of the process, which is inherent in the related art, and hence there is caused no drawback that oncoming vehicles are troubled by being dazzled by the glare so produced.

Thirdly, the stepping motor 58, not a DC motor, is used as the drive source of the rotational shade 34, whereby the rotational shade 34 can be rotated through 45 degrees (90 degrees) only by a matter of 0.1 second (0.2 second). Namely, the light distributions can be switched over between the respective beam corresponding light shielding plates 38*b* to 38*e* by 0.1 second, whereas the light distributions can be switched over between the respective beam corresponding light shielding plates 38*a* (38*f*) and 38*b* (38*e*) by 0.2 second. Due to this, in the embodiment, the light distributions of the beams can be switched over at high speeds and with high accuracy, and a period of time during which the position of the side edge portion of the light shielding plate 38 is lowered below the optical axis L or a period of time during which light is reflected on the surface of the front-inclined light shielding plate which leads to the generation of glare in switching over the light distributions of the beams becomes less by such an extent that the rotational speed of the rotational shade 34 is fast in switching over the light distributions, whereby the generation of glare which dazzles oncoming vehicles is suppressed by such an extent.

Figure 12:
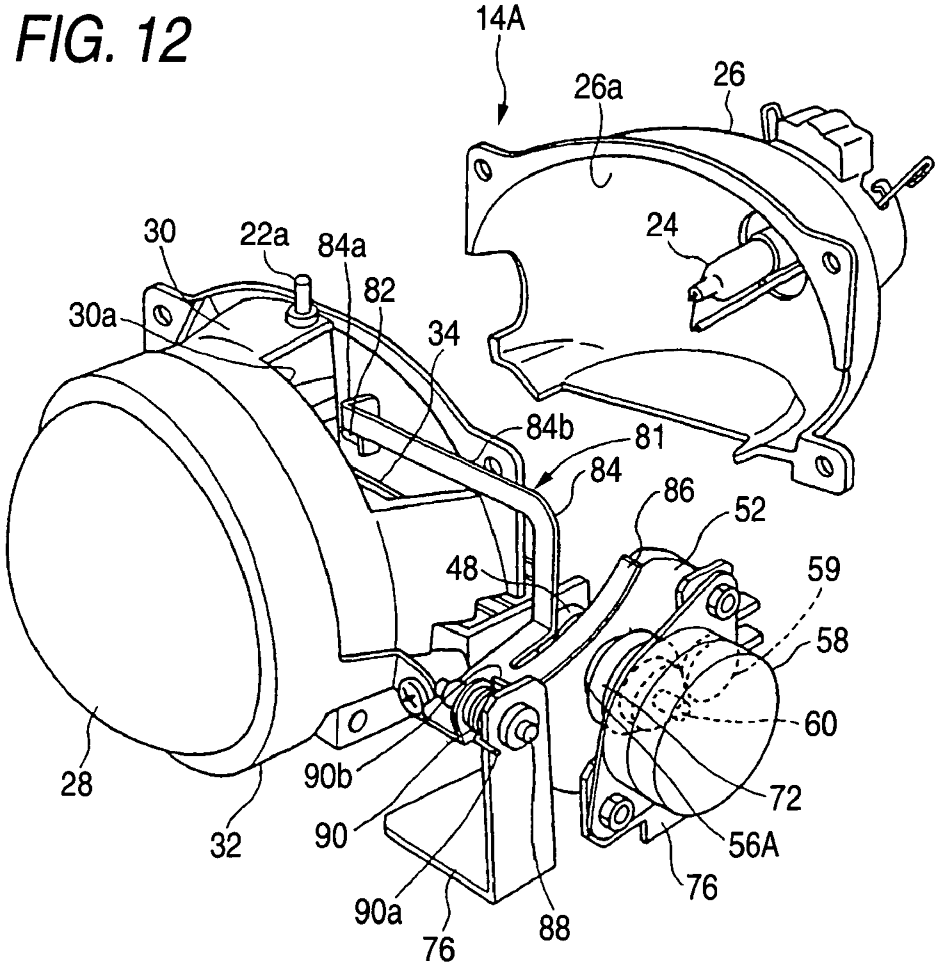
FIG. 12 is an exploded perspective view of a light projecting unit which is a main part of a projector type automobile headlamp according to a second embodiment of the invention.
Figure 13:
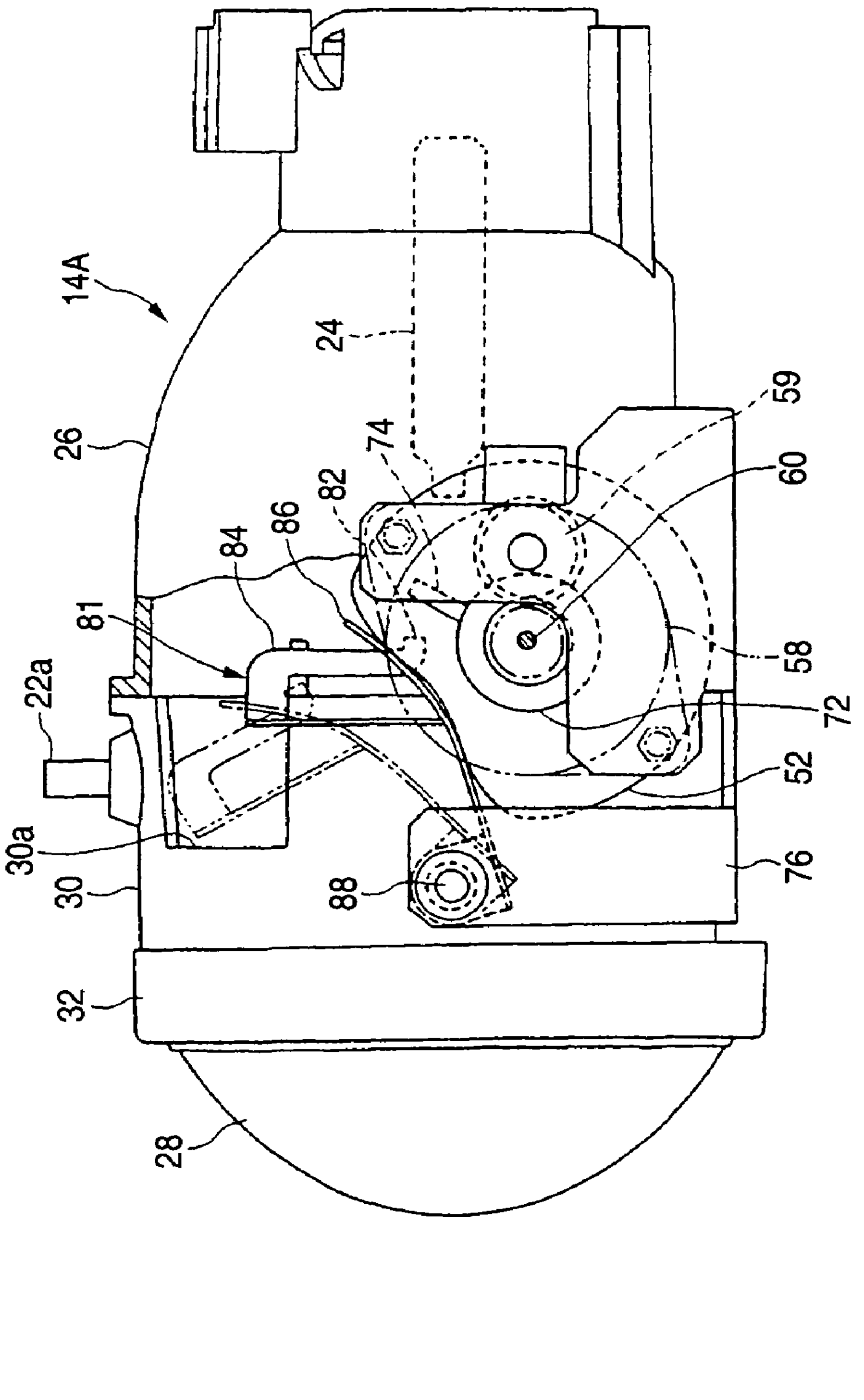
FIG. 13 is a side view of the same light projecting unit.
Figure 14:
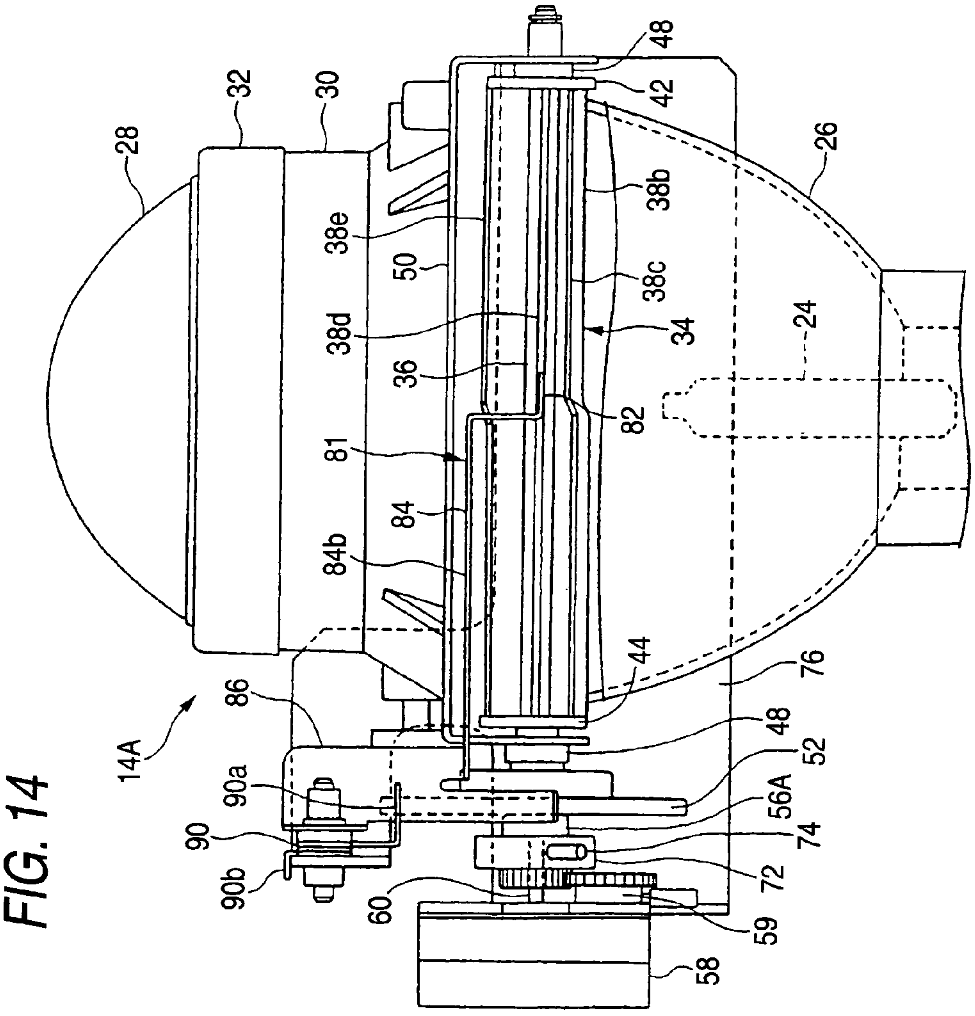
FIG. 14 is a partially sectional plan view of the same light projecting unit.
Figure 15:
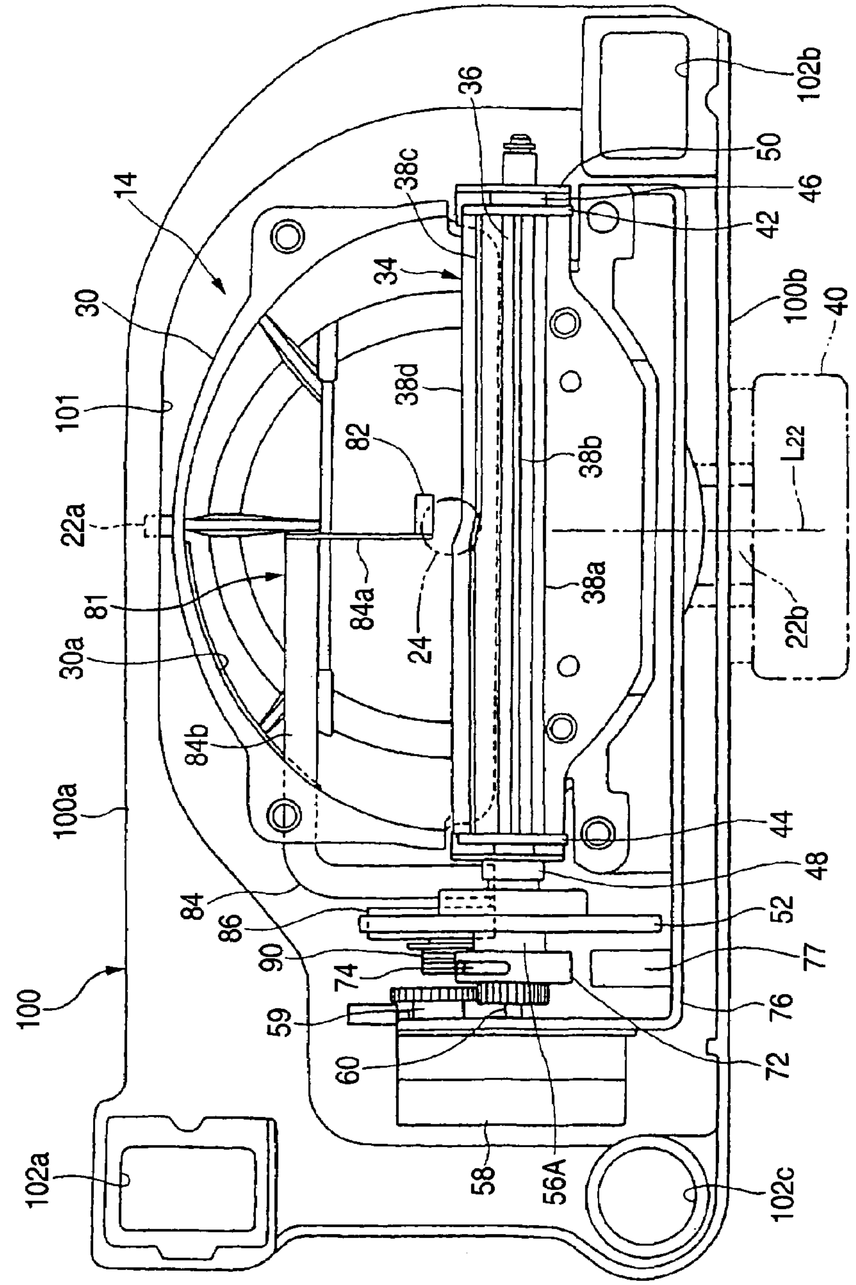
FIG. 15 is a rear view of the same light projecting unit that is integrated into a unit frame with a reflector being removed therefrom, as viewed from the rear.

FIGS. 12 to 15 show a projector type vehicle headlamp according to a second embodiment of the invention, in which FIG. 12 is an exploded perspective view of a light projecting unit which is a main part of the same headlamp, FIG. 13 is a side view of the same light projecting unit, FIG. 14 is a partially sectional plan view of the same light projecting unit, and FIG. 15 is a rear view showing the same light projecting unit which is integrated into a unit frame with a reflector being removed therefrom, as viewed from the rear.

While, in the light projecting unit 14 in the first embodiment, the drive force of the motor 58 is transmitted to the rotational shade 34 via the drive force transmitting mechanism 56 made up of the orthogonal direction change gear set, in a light transmitting unit 14A in the second embodiment, an output shaft 60 of a stepping motor 58 is connected to a rotational shade 34 (a rotational axis 36) in series. Namely, a wet cam 52, which is an eccentric cam, an Oldham's coupling, which makes up a drive force transmitting mechanism 56A, and the stepping motor 58 are disposed on an axial end of the rotational shade 34 (the rotational axis 36) in such a manner as to be connected to each other in series, and the Oldham's coupling 56A is fixedly screwed to the axial end portion of the rotational shade 34 (the rotational axis 36) in a coaxial fashion while being disposed adjacent to the wet cam 52. The stepping motor 58 is made as a drive source for generating a drive force for driving the rotational shade 34 to rotate through a predetermined angle in response to a pulse signal generated in conjunction with a light distribution switching over operation. Then, since the Oldham's coupling 56A is interposed between the output shaft 60 of the stepping motor 58 and the rotational axis 36 of the rotational shade 34, an axial deviation between the output shaft 60 and the rotational axis 36.

In addition, a disk 72, on which a stopper pin 74 is formed in such a manner as to protrude therefrom, is fixed to an outer circumferential surface of the Oldham's coupling 56A, and by allowing the stopper pin 74 to be brought into abutment with a stopper portion 77 provided on a motor bracket 76 to thereby stopped by the stopper portion 77, the rotational range of the rotational shade 34 is restricted.

Since the remaining constructions are identical to those of the first embodiment, by giving like reference numerals to like components to those of the first embodiment, the repetition of the description will be omitted.

In the second embodiment, the rotational shade 34 is connected in series to the motor 58 via the Oldham's coupling 56A, which is the drive force transmitting mechanism, and when compared with the first embodiment where the drive force transmitting mechanism (the orthogonal direction change gear set) 56 having many gears is interposed between the rotational shade 34 and the motor 58, the number of components is reduced and hence the construction becomes simple, the production costs being reduced by such an extent. In addition, in the drive force transmitting mechanism 56A, the loss of drive force that is to be transmitted is reduced by the extent to which the number of constituent components is smaller, and hence the drive force transmitting mechanism 56A is superior on drive force transmission efficiency. Thus, a motor of a small capacity can be used as the drive source of the rotational shade 34, and the costs involved can be reduced by such an extent.

Figure 16:
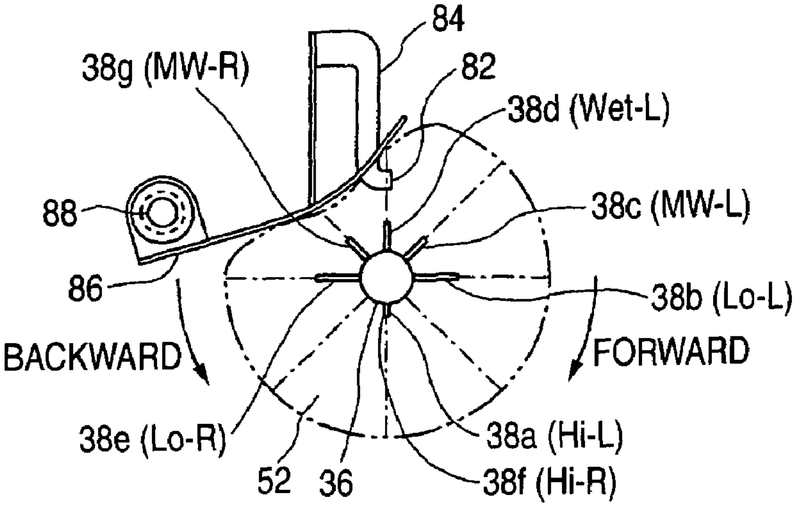
FIG. 16 is a side view of a rotational shade which is a main part of a third embodiment of the invention, which explains the arrangement of light shielding plates thereon.

Note that while the light shielding plates 38*a*, 38*f* which correspond, respectively, to the high beam Hi-L, Hi-R are provided independently on the rotational shade 34 in the first and second embodiments, since the light distribution patterns of the high beams Hi-L, Hi-R are the same, as with a rotational shade 34 according to a third embodiment shown in FIG. 16, the light shielding plates 38*a*, 38*f* which correspond, respectively, to the high beams Hi-L, Hi-R may be made common by adding, for example, a right-hand side traffic expressway beam corresponding light shielding plate 38*f* between the right-hand traffic low beam corresponding light shielding plate 38*e* and the left-hand side traffic rain beam corresponding light shielding plate 38*d*. Then, when the construction is adopted, it is possible to obtain a left-hand side traffic low beam, a left-hand side traffic expressway beam, a left-hand side traffic rain beam, a right-hand side traffic expressway beam and a right-hand side traffic low beam each having a clear cut-off line which is clear, and there is generated no glare when light distributions are changed among these beams.

Figure 17:
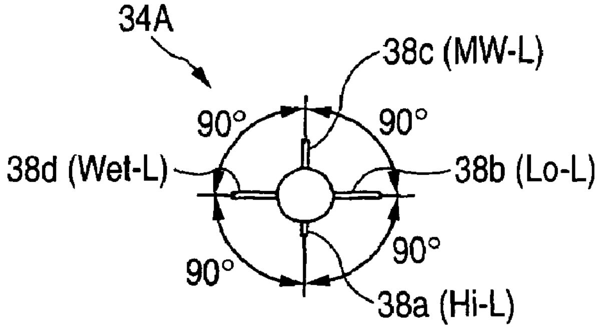
FIG. 17 is a drawing which explains the arrangement of light shielding plates on a rotational shade which is a main part of a fourth embodiment of the invention.
Figure 18:
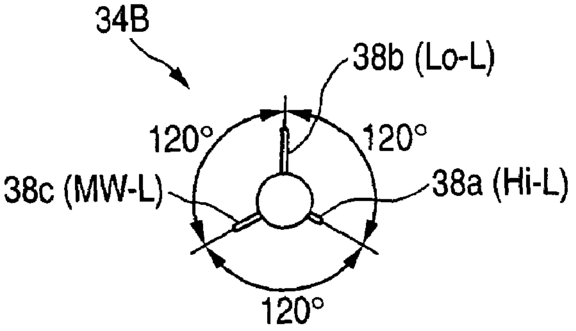
FIG. 18 is a drawing which explains the arrangement of light shielding plates on a rotational shade which is a main part of a fifth embodiment of the invention.

In addition, while in the first, second and third embodiments that have been described heretofore, the left-hand side traffic beam corresponding light shielding plates 38*a* to 38*d* and the right-hand side traffic light shielding plates 38*e*, 38*f* are provided continuously in the circumferential direction on the rotational shade 34, so that the light distributions can be switched over easily between the left-hand side traffic beams and the right-hand side traffic beams, in rotational shades 34A, 34B according to fourth and fifth embodiments of the invention shown in FIGS. 17, 18, respectively, only four types of left-hand side traffic beams or three types of left-hand side traffic beams can be formed thereon.

Namely, on the rotational shade 34A shown in FIG. 17, a left-hand side traffic high beam corresponding light shielding plate 38*a*, the same traffic low beam corresponding light shielding plate 38*b*, the same traffic expressway beam corresponding light shielding plate 38*c* and the same traffic rain beam corresponding light shielding plate 38*d* are disposed in the circumferential direction at a angular interval of 90 degrees.

On the other hand, on the rotational shade 34B shown in FIG. 18, a left-hand side traffic high beam corresponding light shielding plate 38*a*, the same traffic low beam corresponding light shielding plate 38*b* and the same traffic expressway beam corresponding light shielding plate 38*c* are disposed in the circumferential direction at a angular interval of 120 degrees.

Figure 10E:
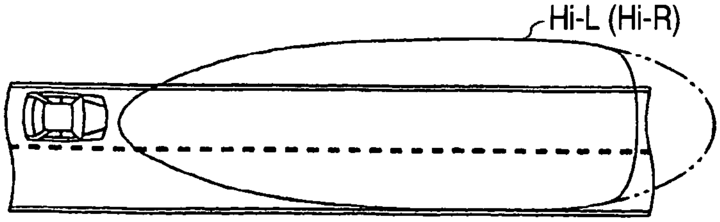

In addition, while, in the embodiments, as shown in FIG. 8E, since the light shielding plates 38*a*, 38*f* which correspond, respectively, to the high beams Hi-L, Hi-R are formed in such a manner as to be slightly taller than the rotational axis 36, the left-hand side traffic and right-hand side traffic high beams Hi-L, Hi-R are, as indicated by imaginary lines shown in FIGS. 9E, 10E, formed into the shapes in which the upper end portions of the light distribution patterns (the distal end portions of the far field illuminated areas ahead of the vehicle) are cut horizontally, the light distribution patterns of the left-hand side traffic and right-hand side traffic high beams Hi-L, Hi-R can be formed into oval shapes which includes the portions defined by the imaginary lines in FIGS. 9E, 10E.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A projector type vehicle headlamp comprising:

a reflector;

a light source;

a projection lens;

a rotational shade rotatable and extending in a direction intersecting with an optical axis of the projection lens substantially at a right angle for forming a light distribution pattern by partially shielding a light from a reflector side towards the projection lens; and a motor for driving the rotational shade, wherein the light distribution pattern is one of a low beam, a high beam or another beam, the rotational shade includes a first light shielding portion for the low beam, a second light shielding portion for the high beam, and a third light shielding portion for the other beam, and the first light shielding portion, the second light shielding portion and the third light shielding portion are radially disposed on a rotational axis of the rotational shade, wherein between the second light shielding portion and the third light shielding portion, the first light shielding portion is disposed.

2. The projector type vehicle headlamp according to claim 1, wherein each central angle between adjacent two of the first light shielding portion, the second light shielding portion and the third light shielding portion is 38° or larger.

3. The projector type vehicle headlamp according to claim 1, wherein each central angle between adjacent two of the first light shielding portion, the second light shielding portion and the third light shielding portion is 38° or larger than 38° and smaller than 180°.

4. The projector type vehicle headlamp according to claim 1, wherein the reflector has substantially cup-like shape.

5. The projector type headlamp according to claim 1, wherein the rotational shade comprises a substantially cylindrical portion, wherein each of the first, second and third light shielding portions extends radially from a surface of the cylindrical portion and wherein the first, second and third light shielding portions are located at a different circumferential positions from one another.

6. The projector type vehicle headlamp according to claim 1, wherein the third light shielding portion comprises a light shielding plate corresponding to an expressway beam.

7. The projector type vehicle headlamp according to claim 1, wherein the other beam comprises an expressway beam.

8. The projector type vehicle headlamp according to claim 1, wherein the third light shielding portion comprises a light shielding plate corresponding to a rain beam.

9. The projector type vehicle headlamp according to claim 1, wherein the other beam comprises a rain beam.

10. The projector type vehicle headlamp according to claim 1, wherein the rotational shade further includes a left-hand side traffic light shielding portion and a right-hand side traffic light shielding portion, wherein the left-hand side traffic light shielding portion and the right-hand side traffic light shielding portion are disposed continuously in the circumferential direction on the rotational shade.

11. The projector type vehicle headlamp according to claim 1, wherein the reflector comprises a primary focal point and a secondary focal point.

12. The projector type vehicle headlamp according to claim 11, wherein the light source is substantially disposed at the primary focal point.

13. The projector type vehicle headlamp according to claim 11, wherein the projection lens is disposed forward of the secondary focal point.

14. The projector type vehicle headlamp according to claim 11, wherein the rotational shade is substantially disposed near the secondary focal point.

15. A projector type vehicle headlamp comprising:

a reflector;

a light source;

a projection lens;

a rotational shade rotatable and extending in a direction intersecting with an optical axis of the projection lens substantially at a right angle for forming a light distribution pattern by partially shielding a light from a reflector side towards the projection lens; and a motor for driving rotational shade, wherein the light distribution pattern is one of a low beam, a high beam or another beam, the rotational shade includes a first light shielding portion for the low beam, a second light shielding portion for the high beam, and a third light shielding portion for the other beam, and the first light shielding portion, the second light shielding portion and the third light shielding portion are radially disposed on a rotational axis of the rotational shade, wherein between the second light shielding portion and the third light shielding portion, the first light shielding portion is disposed, and wherein each central angle between adjacent two of the first light shielding portion, the second light shielding portion and the third light shielding portion is smaller than 180°.

16. A projector type vehicle headlamp comprising:

a reflector;

a light source;

a projection lens;

a rotational shade rotatable and extending in a direction intersecting with an optical axis of the projection lens substantially at a right angle for forming a light distribution pattern by partially shielding a light from a reflector side towards the projection lens; and a motor for driving rotational shade, wherein the light distribution pattern is one of a low beam, a high beam or another beam, the rotational shade includes a first light shielding portion for the low beam, a second light shielding portion for the high beam, and a third light shielding portion for the other beam, and the first light shielding portion, the second light shielding portion and the third light shielding portion are radially disposed on a rotational axis of the rotational shade, wherein between the second light shielding portion and the third light shielding portion, the first light shielding portion is disposed, and wherein the low beam is formed when an edge portion of the first light shielding portion is positioned near the optical axis, the high beam is formed when an edge portion of the second light shielding portion is positioned near the optical axis, and the other beam is formed when an edge portion of the third light shielding portion is positioned near the optical axis.

* * * * *